A. E. BINDER.
LOCKING DEVICE FOR AUTO TOPS.
APPLICATION FILED APR. 24, 1915.
1,183,621. Patented May 16, 1916.
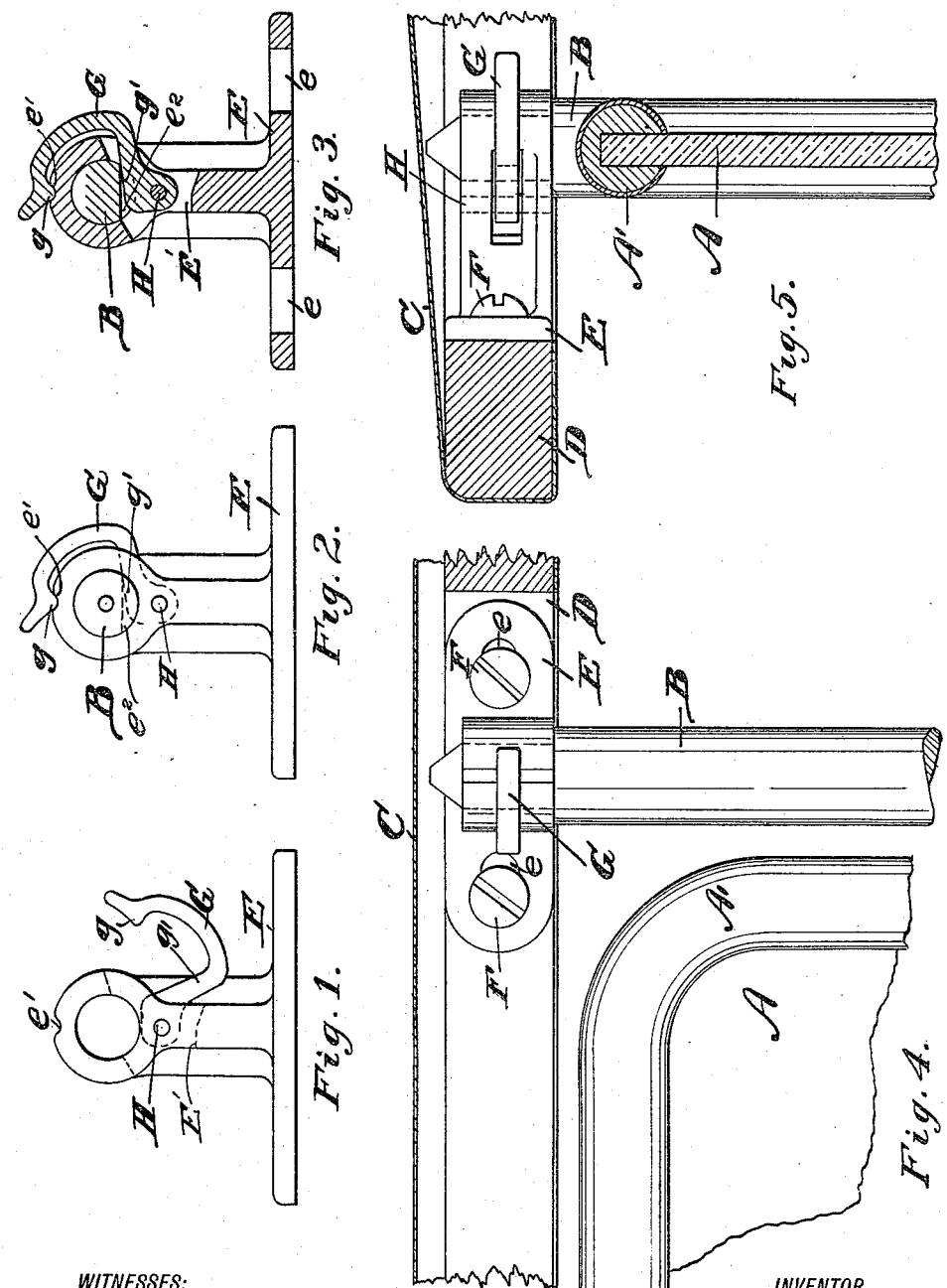
WITNESSES:
L. S. Woodhull
Grace Kyle,
INVENTOR
Albert E. Binder
BY
S. E. Thomas
ATTORNEY

UNITED STATES PATENT OFFICE.

ALBERT E. BINDER, OF DETROIT, MICHIGAN.

LOCKING DEVICE FOR AUTO-TOPS.

1,183,621.  Specification of Letters Patent.  Patented May 16, 1916.

Application filed April 24, 1915. Serial No. 23,550.

*To all whom it may concern:*

Be it known that I, ALBERT E. BINDER, citizen of the United States, residing at Detroit, county of Wayne, State of Michigan, have invented a certain new and useful Improvement in Locking Devices for Auto-Tops, and declare the following to be a full, clear, and exact description of the same, such as will enable others skilled in the art to which it pertains to make and use the same, reference being had to the accompanying drawings, which form a part of this specification.

My invention relates to a locking device for securing the forward end of an auto top to the frame of a wind-shield, shown in the accompanying drawings and more particularly set forth in the following specification and claims.

It has been customary to secure the forward end of an automobile top by straps to some convenient member of the car, but such an arrangement requires frequent adjustment of the straps to keep the top under tension.

The object of this invention is to eliminate the use of straps, and to provide in lieu thereof an inconspicuous device which will securely hold the top against wind pressure.

A further object is to provide a device whereby the forward end of an automobile top may be engaged to the wind-shield supporting frame or be released therefrom by an occupant of the car, without the necessity of leaving the vehicle.

Other advantages and improvements will hereafter appear.

In the drawings accompanying this specification: Figure 1, is an elevation of the device showing the locking latch in its open position. Fig. 2, is a similar view with the locking latch closed. Fig. 3, is a longitudinal-vertical section through the device, showing it engaged with one of the supporting standards of the wind-shield. Fig. 4, is a fragmentary elevation of the wind-shield and one of its supporting standards, indicating a portion of the top in section; the device being secured to the bow of the latter and engaged with the standard of the wind-shield frame. Fig. 5, is a fragmentary view of the top and wind-shield, in section, showing the device engaged with one of the supporting standards of the latter.

Referring now to the letters of reference placed upon the drawings: A, denotes the wind-shield, and A', its inclosing frame.

B, indicates one of the supporting standards of the wind-shield.

C, designates an automobile top, and D, its forward bow.

E, is a bracket provided with elongated slots $e$, to receive the bolts F, by which it is engaged to the bow;—the slots $e$, providing for a slight lateral adjustment of the device with reference to the standards if required to properly engage the latter. The projecting arm of the brackets E, is cut away as indicated at E', to receive a swinging latch G, pivoted thereto by a transverse pin H. The swinging latch is preferably constructed of spring metal and is provided adjacent to its free end with a rib or lug $g$, designed to enter a recess at $e'$ formed in the annular wall at the end of the bracket arm, engaging the standard B, of the wind-shield frame. The upper end of the supporting standard B, is smaller in diameter than the portion below to provide a shoulder upon which the bracket E, rests when engaged therewith. The upper end of the standard is also recessed as indicated at $e^2$, to receive the swinging latch G, which is provided at this point with a shoulder or flattened portion, $g'$, adapted to enter the recess. The standards B, are preferably tapered at the end that the latching device may be readily engaged therewith.

Having indicated the several parts by reference letters, the construction and operation of the device will be readily understood: A pair of brackets E, are attached to the forward bow and adjusted so they will register with respective standards of the wind-shield frame. The top may be engaged with the standards by an occupant of the car without leaving the vehicle, by forcing the annular end of the bracket arms over the tapering projecting end of the standards. Upon the arm of the brackets resting upon the shoulder of the standards, the respective swinging latches are thrown to engage the standards, as indicated in Fig. 2, of the drawings;—the lug on the end of the latch entering the recess provided in the annular wall of the bracket arm.

Having thus described my invention what I claim is:—

1. In a device of the character described, a bracket arm adapted for lateral adjustment, having an eye to receive the standard of a wind-shield frame, a spring latch pivoted to the bracket arm adapted to engage the standard, a lug integral with the latch adapted to enter a corresponding recess provided in the wall of the bracket, whereby the latch may be locked to the standard against accidental release.

2. In a device of the character described, a laterally adjustable bracket arm having an annular wall adapted to receive the standard of a wind-shield frame, the standard notched to receive a swinging latch, the swinging latch pivoted in the bracket arm, having a shoulder adapted to enter the recess formed in the standard of the windshield, and a lug integral with the outer end of the swinging latch, adapted to enter a corresponding recess provided in the annular wall of the bracket for its reception.

In testimony whereof, I sign this specification in the presence of two witnesses.

ALBERT E. BINDER.

Witnesses:
SAMUEL E. THOMAS,
GRACE KYLE.

Copies of this patent may be obtained for five cents each, by addressing the "Commissioner of Patents, Washington, D. C."